United States Patent

Tres Casas

[11] Patent Number: 5,404,911
[45] Date of Patent: Apr. 11, 1995

[54] MONOBLOCK FAUCET

[75] Inventor: Daniel Tres Casas, Vallirana, Spain

[73] Assignee: Caspro, S.A., Vallirana, Spain

[21] Appl. No.: 87,611

[22] Filed: Jul. 2, 1993

[30] Foreign Application Priority Data

| Jul. 7, 1992 | [ES] | Spain | 9202141 |
| Jul. 17, 1992 | [ES] | Spain | 9202263 |
| Sep. 17, 1992 | [ES] | Spain | 9202754 |
| Nov. 18, 1992 | [ES] | Spain | 9203391 |
| Dec. 18, 1992 | [ES] | Spain | 9203727 |

[51] Int. Cl.⁶ .................................. F16K 11/074
[52] U.S. Cl. .......................... 137/625.17; 137/625.4; 137/636.3; 137/801
[58] Field of Search ............ 137/625.17, 625.4, 636.2, 137/636.3, 801; D23/238, 245, 250

[56] References Cited

U.S. PATENT DOCUMENTS

| 4,676,270 | 6/1987 | Knapp et al. | 137/625.17 X |
| 4,735,357 | 4/1988 | Gregory et al. | 137/801 X |
| 4,762,273 | 8/1988 | Gregory et al. | 137/801 X |
| 4,796,666 | 1/1989 | Bergmann | 137/625.17 |
| 4,887,642 | 12/1989 | Bernat | 137/625.17 X |
| 4,981,160 | 1/1991 | Sen-Tein | 137/801 |

FOREIGN PATENT DOCUMENTS

| 2909939 | 9/1980 | Germany . |
| 3402103 | 3/1985 | Germany . |
| 9106262 | 7/1991 | Germany . |

Primary Examiner—John Rivell
Attorney, Agent, or Firm—Darby & Darby

[57] ABSTRACT

A monoblock faucet comprises a main body with a spout and a handle mounted on top of the spout. The main body further includes inlet holes for cold and hot water and a flow controlling cartridge. The handle is linked to the cartridge so that by turning the handle the proportion between the cold and the hot water that flows into the cartridge is changed. The symmetric axis of the inlet holes is displaced in a way so that the position, when the horizontal component of the symmetric axis of the handle is parallel with the horizontal component of the symmetric axis of the spout, corresponds to the maximum cold water position.

18 Claims, 12 Drawing Sheets

MONOBLOCK FAUCET

OBJECT OF THE INVENTION

The present invention refers to a monoblock faucet of the type in which the outflow of water is achieved by previously titting an operating handle mounted on the body itself of the faucet upward, and in which the outflow of hot water or cold water is achieved by partial turning of the operating handle.

The faucet of the invention includes a series of improvements so that the opening of the faucet is done normally in the cold water position, thus preventing the hot water heater from igniting which is produced when the opening of the faucet is done in the hot water position. Including an outflow adjustment device so that the user can adjust the amount of flow, for the purpose of rationalising the water consumption to the needs of each moment, has also been provided for as an improvement.

BACKGROUND OF THE INVENTION

In all monoblock faucets a top operating handle that generally is operated towards one side or the other, with regard to the symmetric axis that coincides with the one of the faucet pipe, is mounted in all faucets in order to achieve cold water or hot water positions, in such a way that the outflow in any position requires the handle to be tilted upward. In other words, when the cited handle is aligned in the same vertical plane as the faucet pipe (position in which the user tends to leave it after each use for purposes of aesthetics) that position is considered the middle one between the cold water and the hot water, in such a way that if the faucet is opened in such a position, it is obvious that cold water and hot water will be mixed (the water comes out warm) which leads to the igniting of the hot water heater and the corresponding energy output. This energy output is unnecessary in the event that the user only requires cold water.

On the other hand, in many occasions the user does not need the entire flow that the faucet provides, thus, unnecessary consumption is caused.

Although there are valves or devices that can adjust the flow, it is no less certain that such means would necessarily have to be included in the faucet in the manufacturing process of the faucet; in other words, no adjustment device that can be included in faucets already manufactured or marketed is known.

DESCRIPTION OF THE INVENTION

The monoblock faucet object of the invention has a series of particularities foreseen to prevent the above cited inconveniences, .in other words, so that the faucet is normally opened in the cold water position and so that the outflow can be adjusted in accordance with the user's needs.

In this sense, one of the improvements consists of providing a specially designed operating handle, which is formed by a body whose contour is rather triangular with rounded vertexes, the corresponding contour tending to form a circular sector, which in the roundest end area has a short circular necked projected towards the bottom surface, through which it adapts to the body of the faucet, or else to an adaptation supplement provided in said body of the faucet. It has the particularity that on that bottom surface it has a square iron rod for coupling to the corresponding rod with a complementary shape, belonging to the water flow control body, said control body being called hereinafter the "cartridge." The handle coupling iron square rod has its symmetric axis slightly out of phase with regard to the symmetric axis of the element or rod on which it is coupled, in such a way that the rotation limit position towards one side, the symmetric axis of the handle coinciding with the symmetric axis of the pouring pipe, will correspond to the cold water maximum.

Therefore, given that the handle tends to face the pipe and that position corresponds with the cold water outflow, it is obvious that the opening of the faucet will normally be done in the maximum cold water position, and the position in which the hot water starts to flow out will only be reached when the handle is clearly turned towards the left, prior raising the handle in order to open the faucet.

This raising or tilting of the handle to open the faucet is done sideways and backwards, in other words, upward and to one side.

The hot water maximum will be obtained when the handle turns toward the maximum limit opposite the cold water limit, the angle being about 110° from the initial limit or cold water outflow position, the hot water starting to flow out when it has been turned about 55° from the cited initial position.

Another improvement consists of the handle being made in such a way that it is practically inserted in the top part of the body of the faucet, occupying almost the entire extension of the top part, all of this in such a way that the handle remains rather close to the body of the faucet, in the cited superimposed position that corresponds to the closed position. In this position it is practically impossible to raise the handle with one's fingers in order to open the faucet. It is necessary to previously turn the same so that once it is out of phase anglewise with regard to the body or pipe of the faucet the tilting upward of the cited handle and the opening of the faucet can be achieved.

Only in the opening position can the handle be moved to the cold water, hot water or mixture passages, depending on the user's desires and once the operation has ended, after the corresponding closing, the handle is collapsed upon the body of the faucet in order to occupy the original position that prevents it from being opened again unless it has been turned to one side as stated.

Another one of the improvements consists of the two cold water and hot water intake holes in the pipe, instead of being made symmetric to the longitudinal axis of said pipe, they are made in such a way that the symmetry of such holes is regarding an axis displaced anglewise in terms of the longitudinal axis itself of the pipe. The cited angular outphasing will correspond to half the amplitude established between the two end positions of the operating handle, in such a way that in one of the end positions, the one corresponding to the cold water maximum, the symmetric axis of the handle coincides with the symmetric axis of the pipe, while the other position will be reached by turning the handle towards the hot water side, there being numerous possibilities to obtain different water temperatures between both limit positions. Therefore, the purpose that is achieved with these solutions is the same as the one cited above.

Another advantage consists of the cited cold water and hot water passage holes being made in an inclined manner, so that based on the locking between the cartridge and the faucet body, the locking between the symmetric axis of the outlet holes of the cartridge also remain displaced anglewise with regard to the longitudinal axis of the pipe. The amplitude of the anglewise displacement is approximately equal to half the angle formed between the two limit positions of the handle. The symmetric axis of the handle remains aligned with the symmetric axis of the pipe in the cold water maximum position, in other words, as in the previous cases.

On the other hand, it has been optionally foreseen that the cartridge have a supplement located between the base of the cartridge itself and the seat of the faucet body, whose supplement will have the respective inclined holes for the flow of water from the faucet body to the inside of the cartridge, obtaining the above cited angular positions, just like in the previous case.

It has also been provided for that when the cartridge is of the type in which the water outflow is done freely from its own base, in such a case the above cited supplementary piece will be placed between the mouth of the water intake ducts and the seat of the faucet body.

Another improvement consists of including a flow adjustment device, by means of which it is possible to control the outlet flow itself. The adjustment device is mounted on the water outlet pipe itself, in correspondence with the bottom part of said pipe, for the purpose of hiding its location.

This adjustment device is structurally comprised of a threaded rod that has a reduction of area in correspondence with the center part, so that irrespective of the rotation position in which it is located the flow of water will be greater or smaller.

This adjustment rod has an operating head that emerges partially outside the rod and has a diametral groove in order to facilitate changing the angular position of the same and thus the outlet flow of water can be controlled, with the particularity that in said head there is at least one anular groove to house an O-ring seal, upon applying pressure against the smooth cylindric part of the threaded placement hole of the adjustment device.

Advantageously, in the closed position of the adjustment device, the total flow of water is not prevented, but rather a minimum flow is allowed.

DESCRIPTION OF THE DRAWINGS

In order to complete the description that is made hereinafter and for the purpose of providing a better understanding of the features of the invention, the present specification is accompanied by a set of drawings in whose figures the innovations and advantages of the monoblock faucet made in accordance with the object of the invention will be more easily understood.

The following has been represented in said figures.

DESCRIPTION OF THE PREFERRED EMBODIMENT

In view of the cited figures, the monoblock faucet object of the invention includes a faucet body (1) with its corresponding pipe (2) for the outflow of water.

According to the first embodiment shown in FIGS. 1 to 8, an operating handle (3) whose contour can be considered as rounded and triangular is mounted on the top of said faucet. Its shape is close to a circular sector with an opening (4) in correspondence with one of its corners and whose opening is provided so that the user insert one or two fingers in order to easily move said handle (3)

In the roundest part and in correspondence with the surface considered as the bottom one, said handle (3) has a cylindric shape (5) with a housing (6) determining a square iron rod for assembly and coupling of said handle (3) upon a rod (7) with a complementary shape provided for this purpose in the faucet body (1), a rod (7) which is connected to the corresponding cartridge (8), emerging with the top part of the faucet body (1) so that the handle (3) can be coupled.

Figure 1:
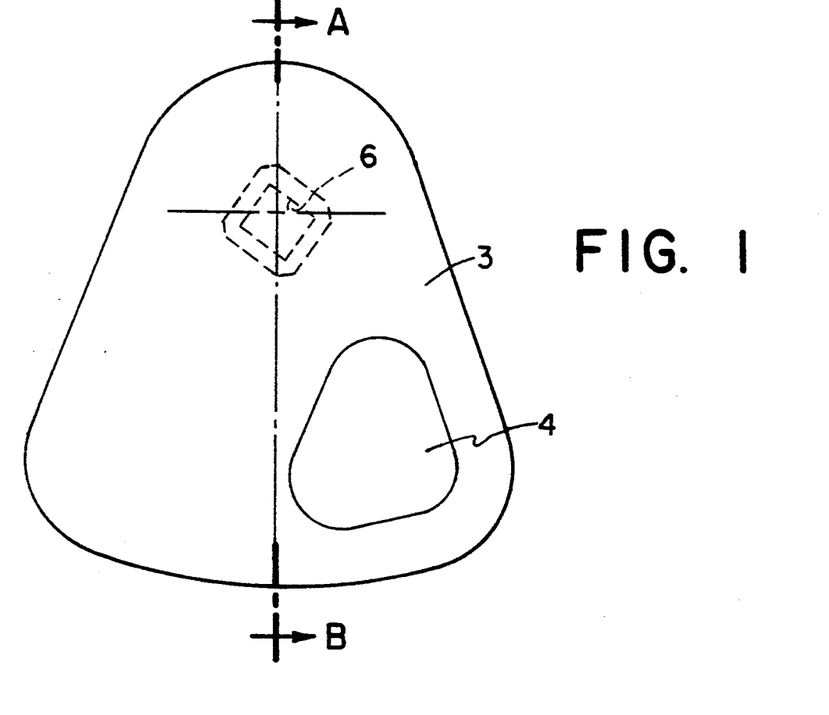
FIG. 1—It is a top plan view of the handle that forms part of the monoblock faucet, according to the preferred embodiment.
Figure 2:
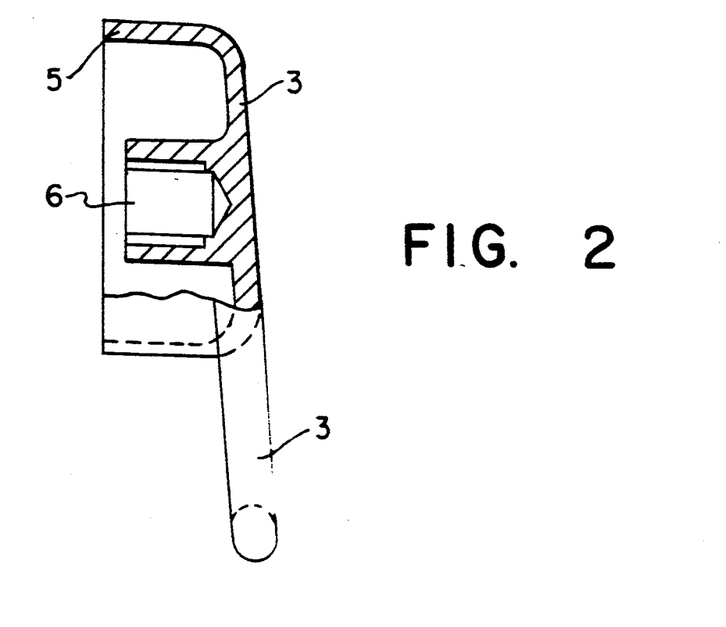
FIG. 2—It is a longitudinal section view corresponding to the section line A-B of the same handle represented in the previous figure.
Figure 3:
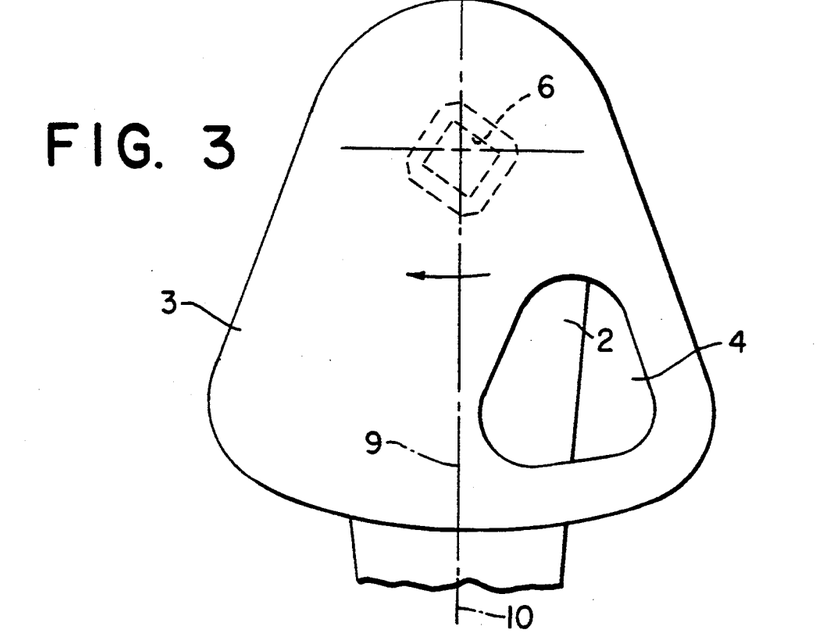
FIG. 3—It is the handle of FIG. 1 placed upon the pipe of a faucet, the symmetric axes of both bodies coinciding, corresponding to the maximum cold water position.

The assembly of this handle (3) on the faucet body is such that in a rotation limit position of the handle (3), the symmetric axis (9) of the handle coincides with the symmetric axis (10) of the pipe itself (2), as is represented in figure (3), this position corresponding to the maximum cold water point.

Figure 4:
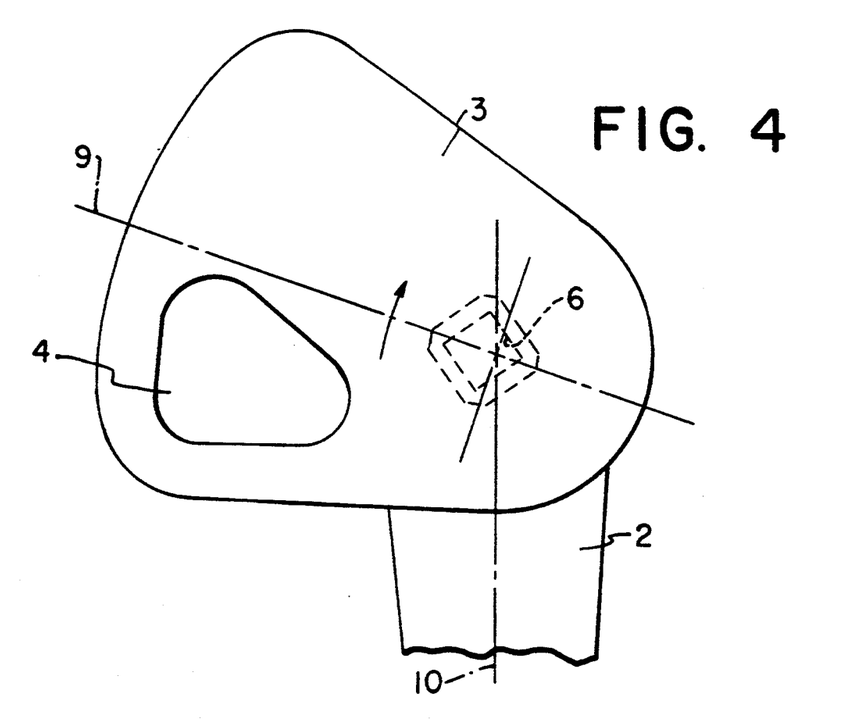
FIG. 4—It is the same representation of the previous figure with the handle turned towards the maximum hot water position.

As of this position the handle (3) can turn towards the left as represented in FIG. 4 to another limit position that will correspond to the maximum hot water point, the cited sector having amplitude of about 110°. The handle (3) mounted in such a way that it is projected backward with regard to the pipe (2) is seen in FIGS. 5 and 6.

Figure 5:
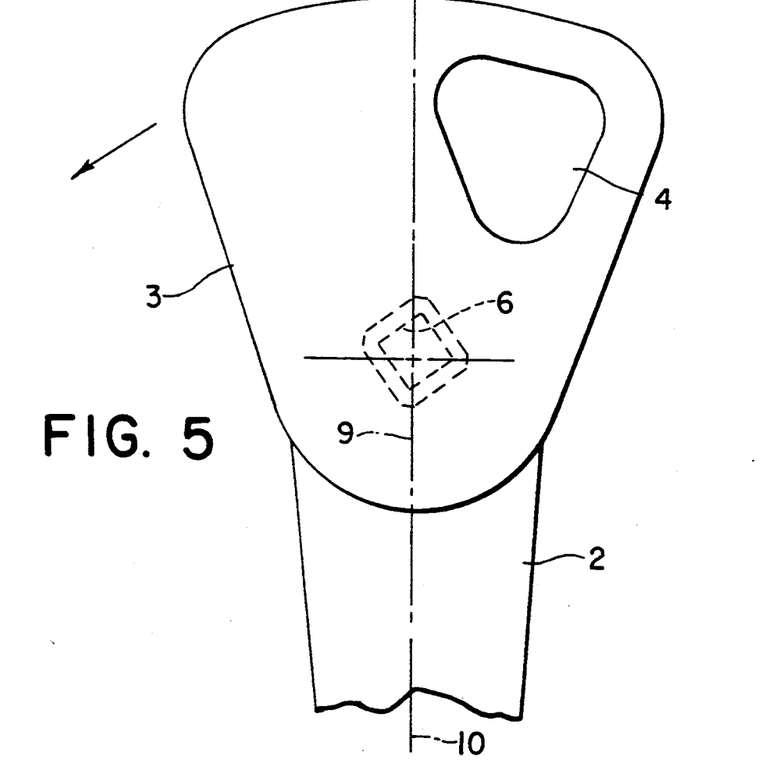
FIG. 5—It is a view similar to that of FIG. 3 but with the handle mounted with regard to the pipe in an opposite position, in other words, the cited handle instead of being located above the pipe and oriented forward is located above the pipe but projected backwards.
Figure 6:
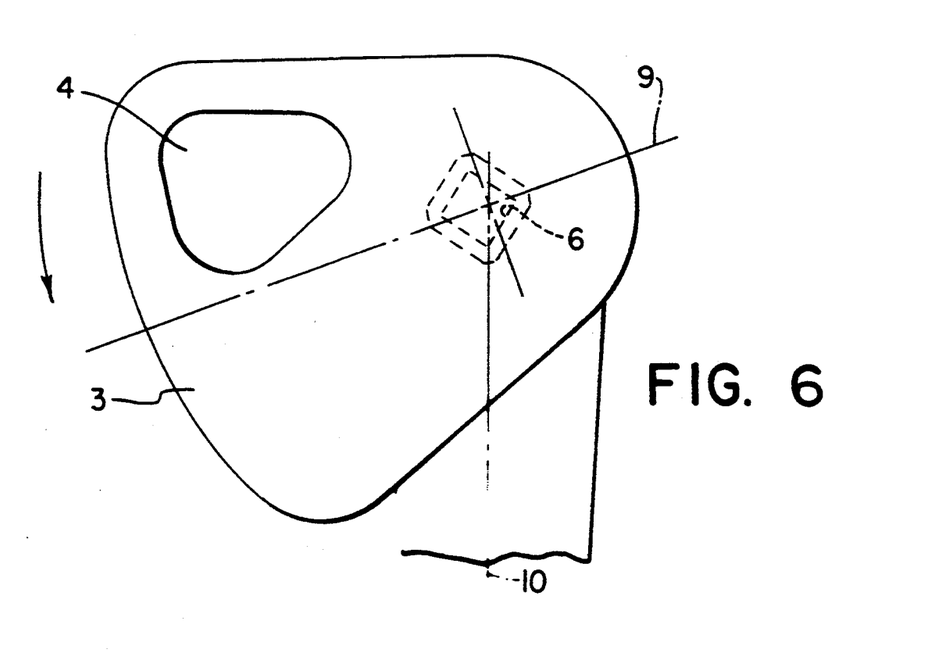
FIG. 6—It is the same embodiment represented in the previous figure with the handle turned towards the maximum hot water position.
Figure 7:
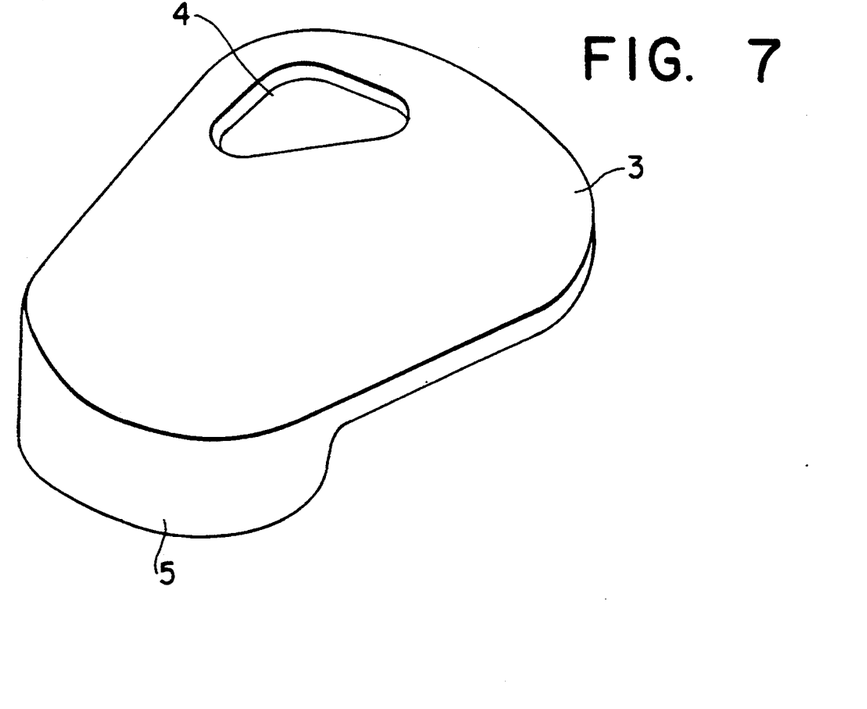
FIG. 7—It is a schematic representation according to a general perspective of the handle represented in all the previous figures.
Figure 8:
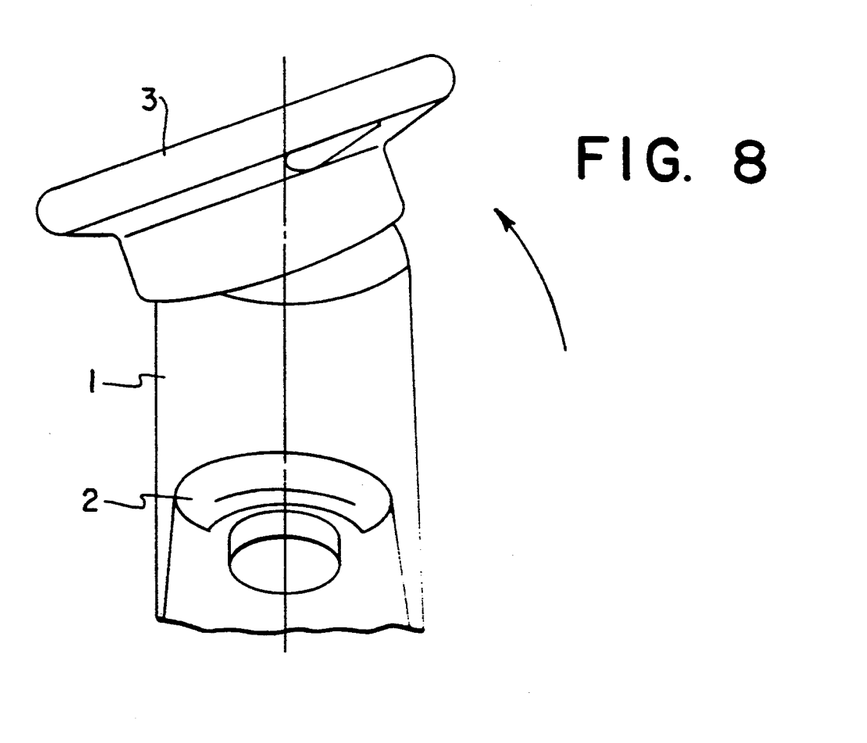
FIG. 8—It is a schematic perspective view of the handle mounted on the faucet body, allowing one to see the tilting backward and to one side of the handle in order to open the faucet.

The functioning is as follows:

In the cold water limit position, which corresponds to FIGS. 3 and 5, the symmetric axis (9) of the handle (3) is in alignment with the symmetric axis (10) of the pipe (2), this being the normal position after each use. Now then, in this position if the handle (3) is moved to open the faucet, it will have to be tilted backward and towards one side as shown in FIG. 8. The faucet will open and cold water will flow out. If one wants hot water, the handle (3) must be turned towards the Other limit position as shown in FIGS. 4 and 6, in such a way that from a rotation of about 55° hot water mixed with cold water starts to flow out. The maximum hot water is obtained in the rotation limit position opposite the initial position.

As can be seen in FIGS. 1, 3, 4, 5 and 6, the vertical axis of the handle does not correspond with the vertical axis of the rod (7) belonging to the cartridge (8) comprising the faucet opening device, in such a way that the outphasing between the cited vertical axes is due to the slant that the rod (7) must have with regard to the square iron rod (6) on which it is mounted, when the opening operation is started.

Figure 9:
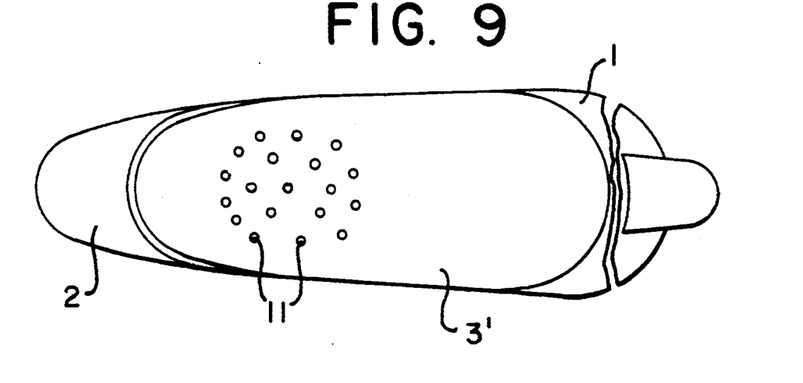
FIG. 9—It is a varied embodiment of the handle placed above the faucet pipe and in this position it cannot be raised in order to open the faucet.
Figure 10:
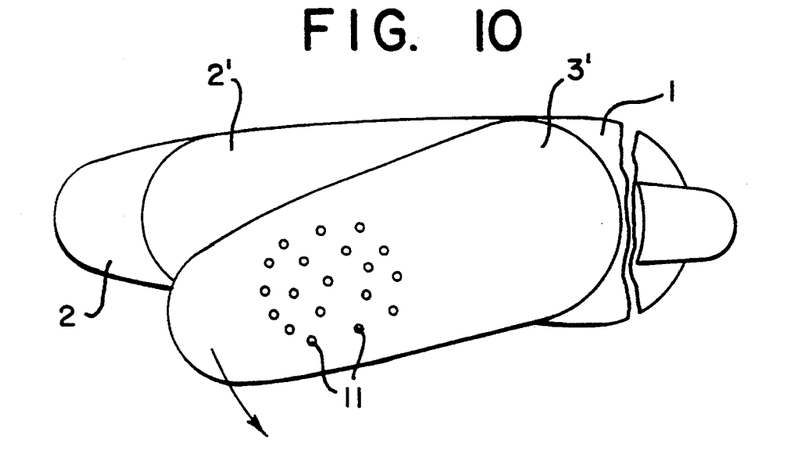
FIG. 10—It is the same embodiment as the previous figure but with the handle turned slightly with regard to the faucet pipe in order to enable the handle to be pushed upward and tilted in order to be able to open the faucet.
Figure 11:
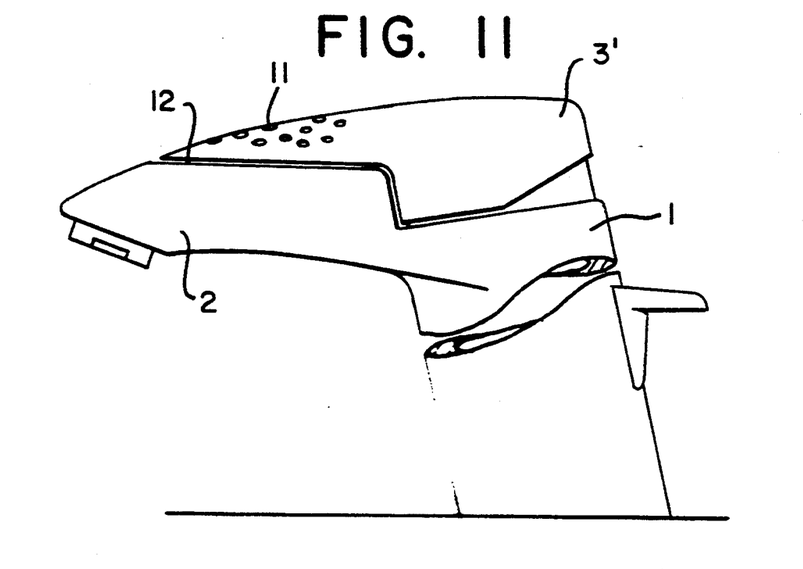
FIG. 11—It is a raised side view of the embodiment shown in the two previous figures, it being possible to see how the handle has the bottom plane close to the top plane of the faucet pipe preventing when the two bodies are superimposed the handle from being pushed upward.

In a varied embodiment as is shown in FIGS. 9, 10 and 11, the faucet includes a handle (3') whose shape is such that the same remains situated with one part of its bottom surface in correspondence with a recess or flat surface (2') of the pipe itself (2), as is clearly represented in the figures cited last, this handle (3') having an elongated shape and it can be placed from a position aligned with and superimposed upon the pipe itself (2) of the faucet, as is seen in FIG. 9, up to a rotation limit position in the direction indicated by the arrow represented in FIG. 10, with the particularity that in the position represented in FIG. 9 the bottom plane of the handle (3') remains positioned with regard to the upper plane (2') of the pipe (2) with a minimum separation (12), determining a groove that prevents one from being able to insert one's finger tip in order to tile the handle (3') and corresponding opening of the faucet, in such a way that in order to be able to tilt same first of all it is necessary to turn the handle (3') a portion, as shown in FIG. 10, by the user resting the palm of his hand on the area with protrusions (11) provided for on the surface of said handle (3'.) Once it is turned this portion, the end of the handle (3') remains cantilevered off, which permits it to be pushed by hand in order to tilt same which corresponds to the opening of the faucet, as of which position the user can turn the handle (3') in order to obtain the different cold water, hot water or warm water positions. In other words, by means of this placement of the handle (3') it is impossible to open the faucet when the same is aligned up with the top surface of the pipe (2.) First of all the handle (3') must be turned and afterwards the user seeks the cold water, hot water or warm water points desired, at which time the cited handle (3') will have its free end pushed upward.

Figure 12:
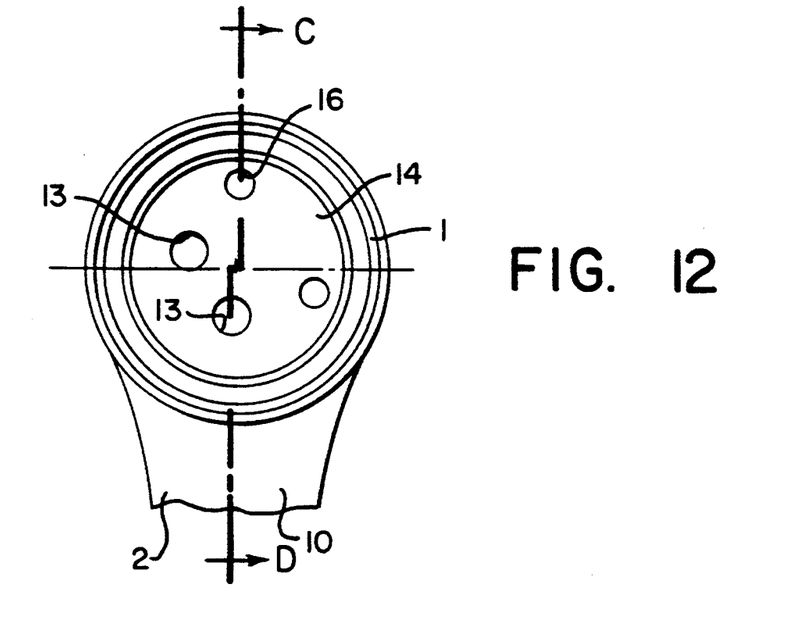
FIG. 12—It is a plan view of the base of the monoblock faucet body, on which the corresponding cartridge is to be supported, permitting one to see the two holes for cold water and hot water in the base in a position whose symmetric axis is out of phase regarding the symmetric axis of the corresponding pipe. In this figure one can also see the locking holes for the respective cartridge.
Figure 13:
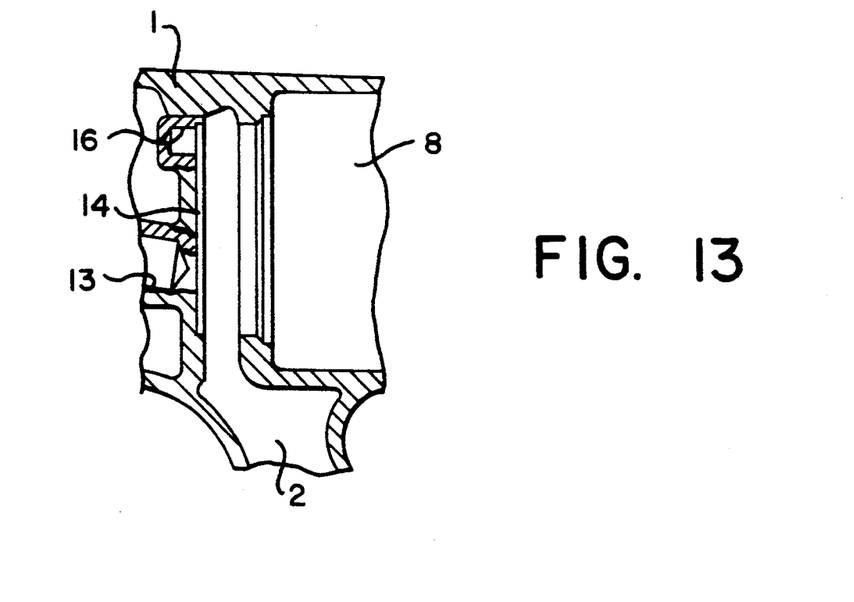
FIG. 13—It is a section view corresponding to the section line C-D of the above figure, showing the faucet body, the location of the corresponding cartridge and the slant of the water passage holes, as well as the locking of the cartridge with regard to the faucet body.

Another varied embodiment to achieve opening of the faucet is done normally in the maximum cold water position as is represented in FIGS. 12 and 13, in which the corresponding cold water and hot water holes (13), provided for in the seat (14) partition of the faucet body (1) for the cartridge (8) are placed in such a way that the symmetric axis (15) of the same out of alignment with regard to the symmetric axis (10) of the pipe (2), in such a way that this angular displacement between the axes (10) and (15) is approximately half the degrees between the end positions of the respective operating handle, in such a way that when the symmetric axis of the latter coincides with the symmetric axis (10) of the pipe (2), the position will correspond to the cold water maximum, and if in such a position the handle is tilted the faucet will open in the cold water position, and in order to obtain hot water it will be necessary to turn said handle as already stated above.

In other words, by virtue of this positioning of the water intake holes (13), when the handle is aligned with the pipe (2) cold water will flow out, if the handle is tiled and the faucet opens correspondingly.

In these FIGS. 12 and 13 the holes or openings (16) likewise made in the base or diametral partition (14) of the faucet body (1) can be seen. The pivots that emerge from the corresponding cartridge (8) will be positioned in holes (16) so that the cartridge (8) is locked with regard to the faucet body (1.)

Figure 14:
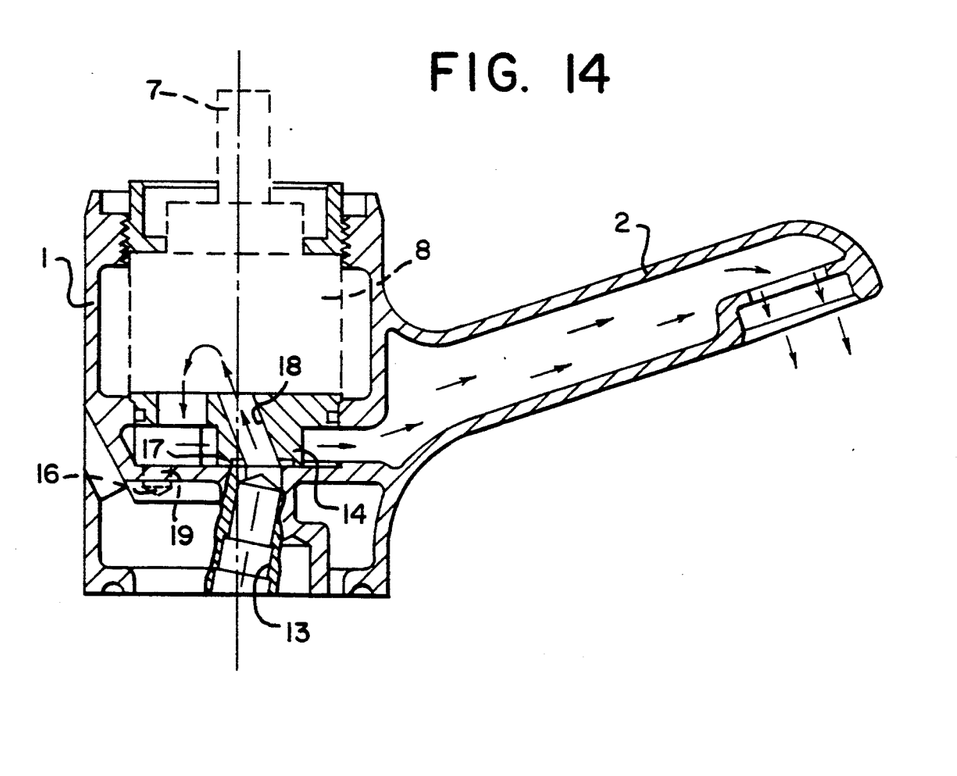
FIG. 14—It is a side raised section view with dash line of the monoblock faucet with the corresponding cartridge and the communication holes oriented in a slanted manner.
Figure 15:
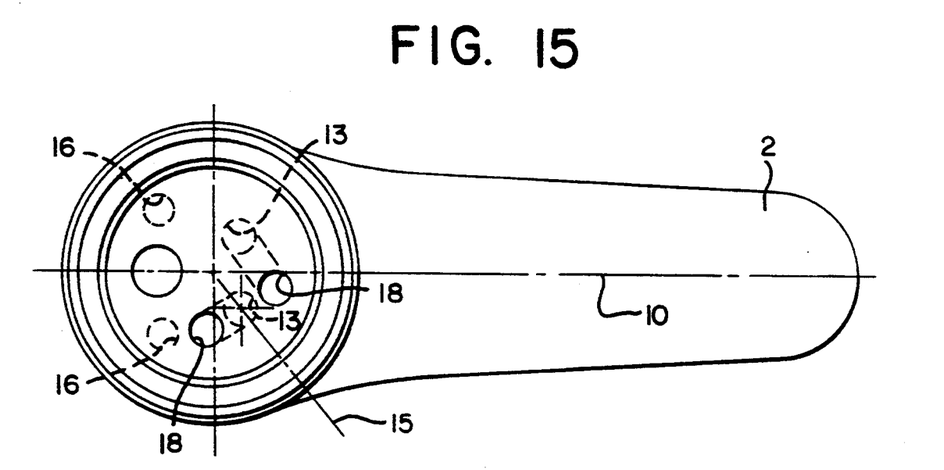
FIG. 15—It is a plan view also with a dash line, of the same faucet as that of the previous figure, permitting one to see the cartridge communication holes with those of the faucet body, defining inclined passages.

In a different embodiment shown in FIGS. 14 to 19, one can see how the cartridge (8) includes a base (17) whose corresponding hot water and cold water holes (18) are inclined, holes (18) which are the ones that determine the flow of water from the faucet body (1), in other words from the holes (13) to the inside of the cartridge (8), in order to flow from here through the pipe (2), as is clearly represented in FIGS. 14 and 15. One can also see the locking holes (16) for the pivots (19) of the base itself (17) of the cartridge (8), where the symmetric axis (15) of the holes (18) is displaced anglewise with regard to the symmetric axis (10) of the pipe (2), this anglewise displacement being approximately half the angle that determines the portion corresponding to the limit positions of the operating handle, the symmetric axis of said operating handle coinciding with the axis (10) of the pipe (2) in the maximum cold water position, in other words, exactly identical to the case cited above.

Figure 16:
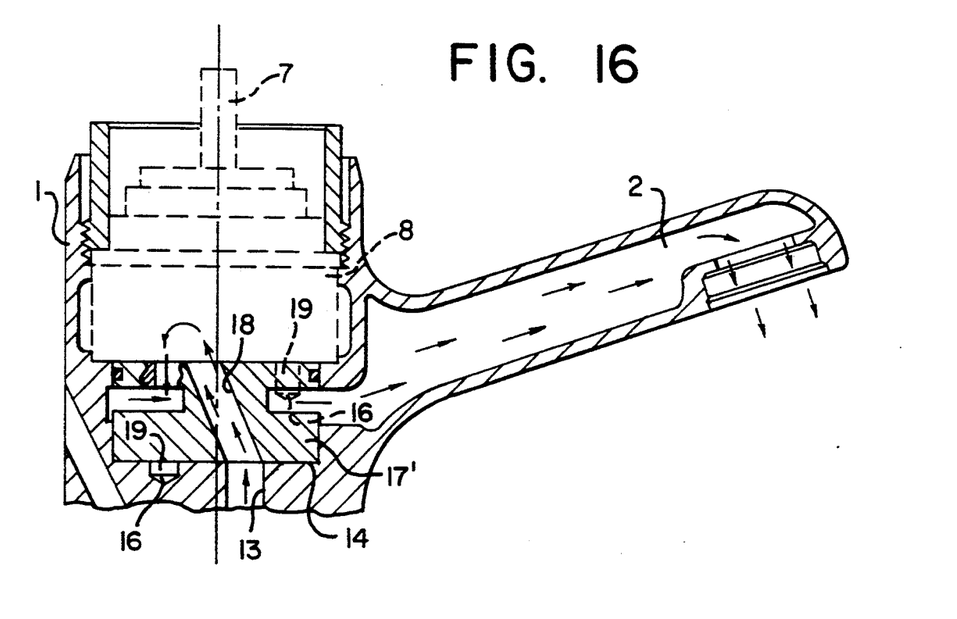
FIGS. 16 and 17—They are both views similar to the previous ones with a middle supplement between the bottom part of the cartrdige and the seat base of the faucet body.
Figure 17:
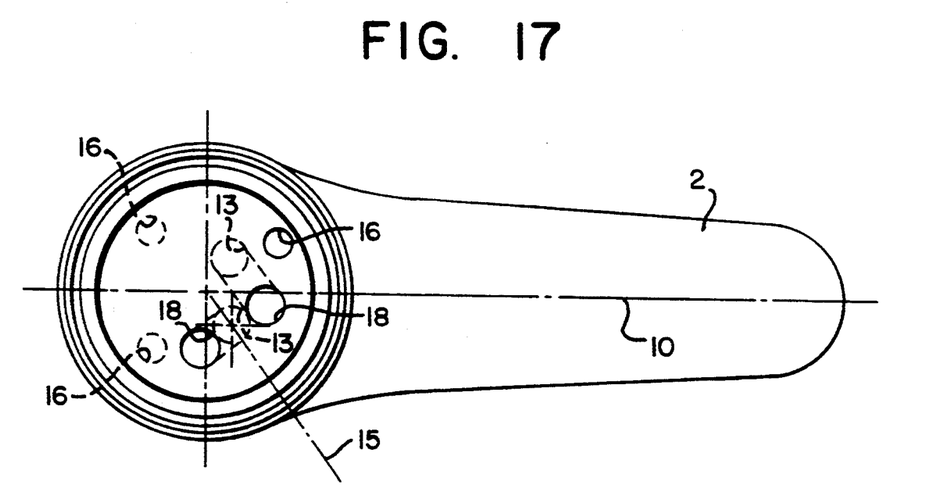

In FIGS. 16 and 17 one can see how between the seat (14) base of the faucet body (1) and the cartridge itself (8) a supplementary piece (17') provided with the corresponding inclined holes (18) as in the previous case, is located, carrying out the locking between the cartridge (8) and the supplementary piece (17'), as well as between the latter and the faucet body (1), by means of the respective holes (16) and stubs (19.)

Figure 18:
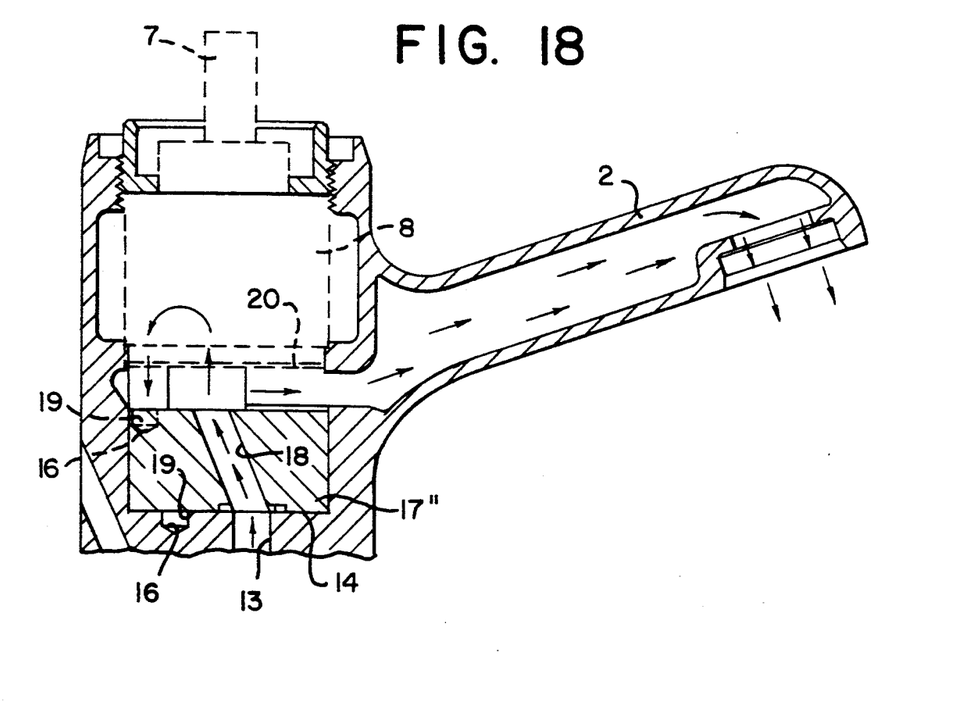
FIGS. 18 and 19—They are two other views similar to the two previous ones where a supplementary piece is to be inserted between the cartridge and the seat base of the faucet body, when the cartridge is of the type in which the outflow of water is done freely from the base itself.
Figure 19:
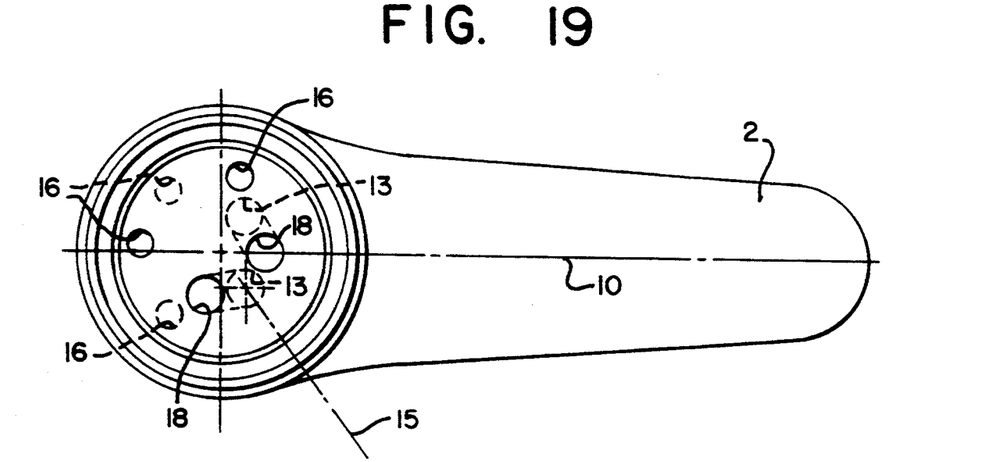

In FIGS. 18 and 19 the faucet is shown with a cartridge (8) of the type whose water outflow is done freely from the base itself (20) of the cartridge (8), in such a way that in this case the supplementary part (17") likewise has its holes (18) inclined and it is also locked by means of holes (16) and stubs (19). The holes (18) of the supplementary Dart (17") lead into the duct (21) through which there is communication between the supplementary part (17") and the inside of the cartridge (8.)

Just like in the previous cases the symmetric axis (15) of the holes (18) is displaced anglewise with regard to the symmetric axis of the pipe (2.)

In all of the cited cases, when the symmetric axis of the operating handle is aligned up with the symmetric axis (10) of the pipe (2), it will correspond to the maximum cold water position, whereby the opening of the faucet in said position will never lead to the igniting of the hot water heater, with the subsequent energy saving which is what is sought on the grounds of all of the described embodiments.

Figure 20:
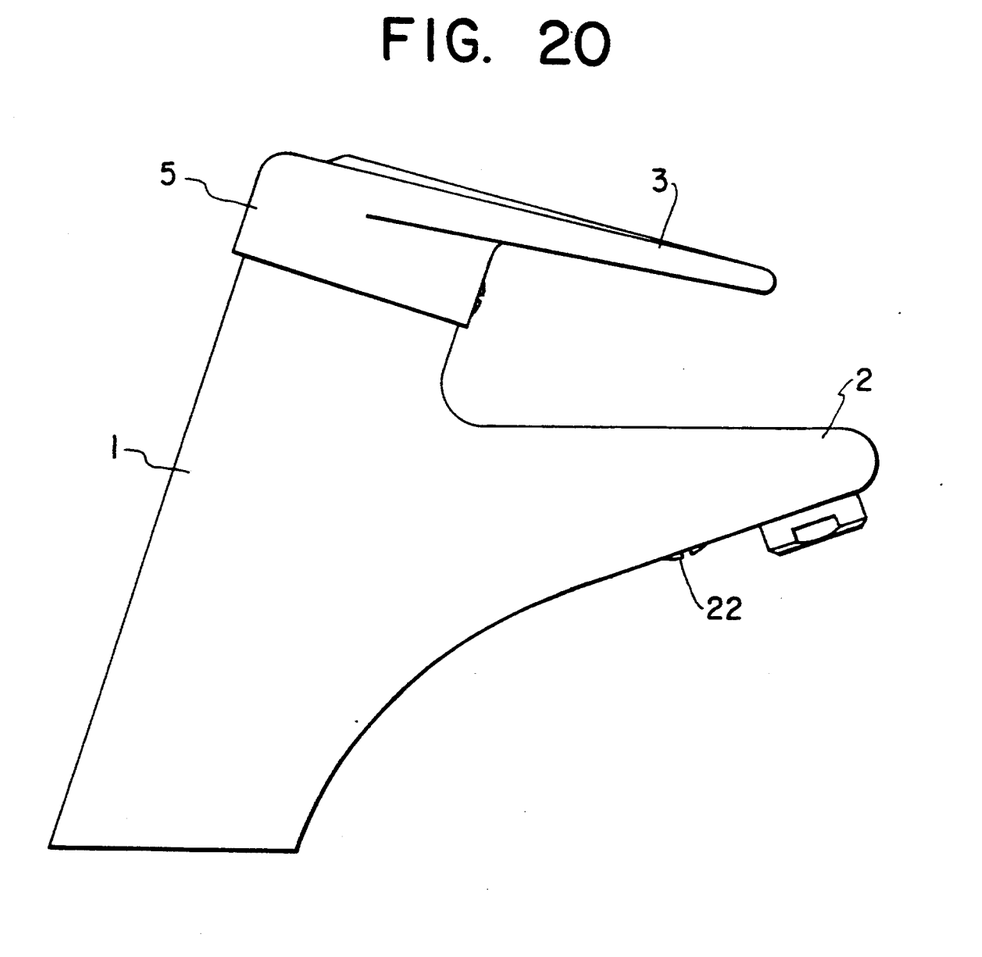
FIG. 20—It is a schematic view according to the raised side view of the monoblock faucet of the invention including the flow adjustment device in the bottom part or surface of the pipe.

On the other hand, the faucet can be completed with a flow adjustment device, which is placed upon the bottom surface of the pipe itself (2) as is seen in FIG. 20, in such a way that the flow adjustment element or device has a head (22) with a diametral groove in order to move the same and operate said adjustment device and thus manage to control a larger or smaller outflow of water.

In this sense, it has been foreseen that the pipe (2) of the faucet includes inside a transversal partition (23) that has a center break or middle opening (24), in which a rod (25) that pivots around its own axis is situated. The rod has two side recesses (26) that define a diametric plate (27) which constitutes the element that limits the flow of water to adjust outlet flow. The middle opening (24) of the transversal partition (23) is defined by a side hole (28) made in the pipe itself (2), hole (28) which is threaded inside for the purpose of receiving the outer thread of the rod itself (25), whose head (22), as has been said above, slightly sticks outside the pipe (2), specifically through the bottom surface of the latter so that it can be moved by means of its diametral groove (24), by means of a suitable tool, such as a coin, screwdriver, etc.

This diametral groove (29) of the head (22) corresponding to the pivoting rod (25) is advantageously coplanar to the diametral plate (27) defined by the side recesses (26) of the rod itself (25), so that its position visually indicates the position of the diametral plate (27) in the inside of the pipe (2), thus making the control operation easier.

The head (22) has an annular throat (30) in which a seal (31) adjusted to the diameter of the mouth of the side hole (28) that defines its housing, is located.

Figure 21:
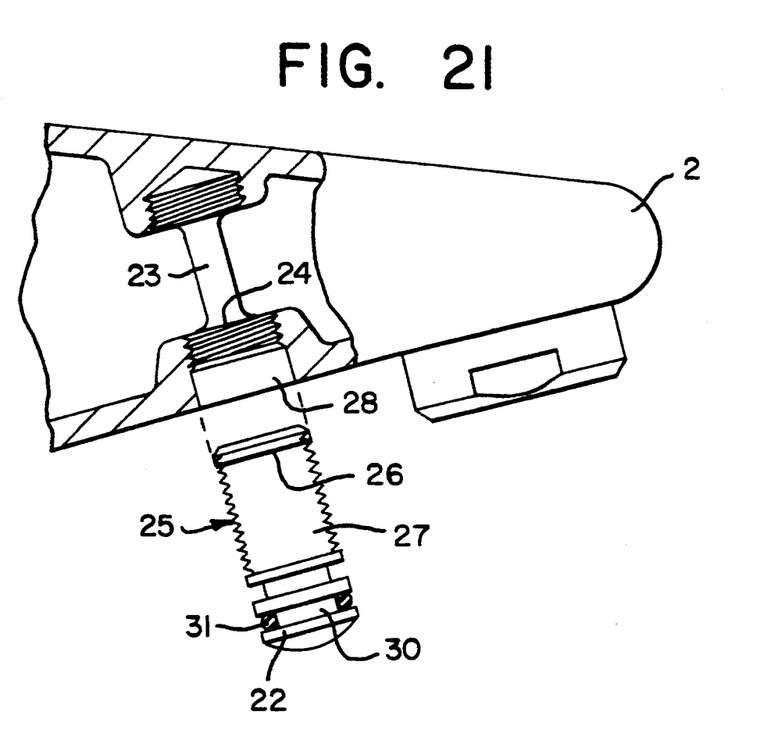
FIG. 21—It is a partial section view of the pipe corresponding to the faucet represented in the previous figure, with the flow adjustment device separated therefrom.
Figure 22:
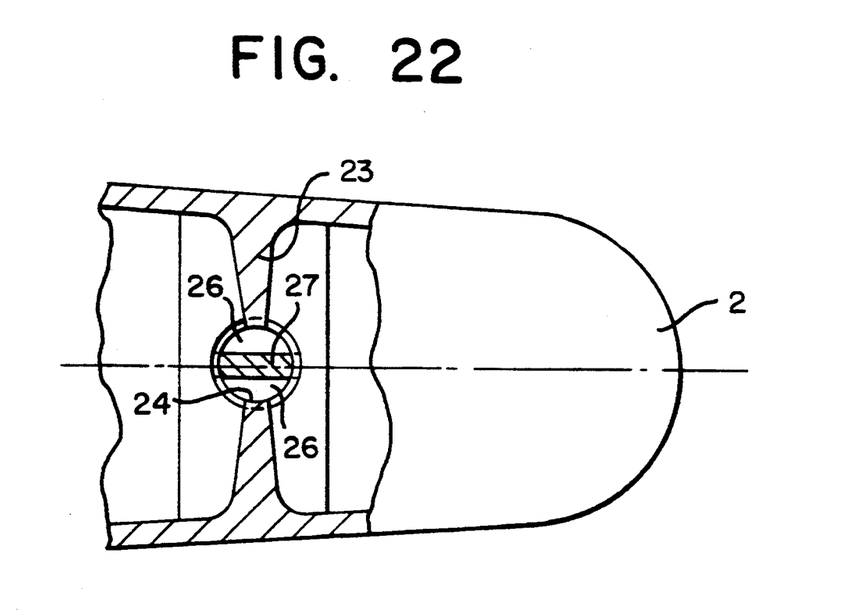
FIG. 22—It is a partially sectioned plan view of what is represented in the previous figure, allowing one to see the adjustment device in a position that permits the total flowing of water through the corresponding outlet duct.
Figure 23:
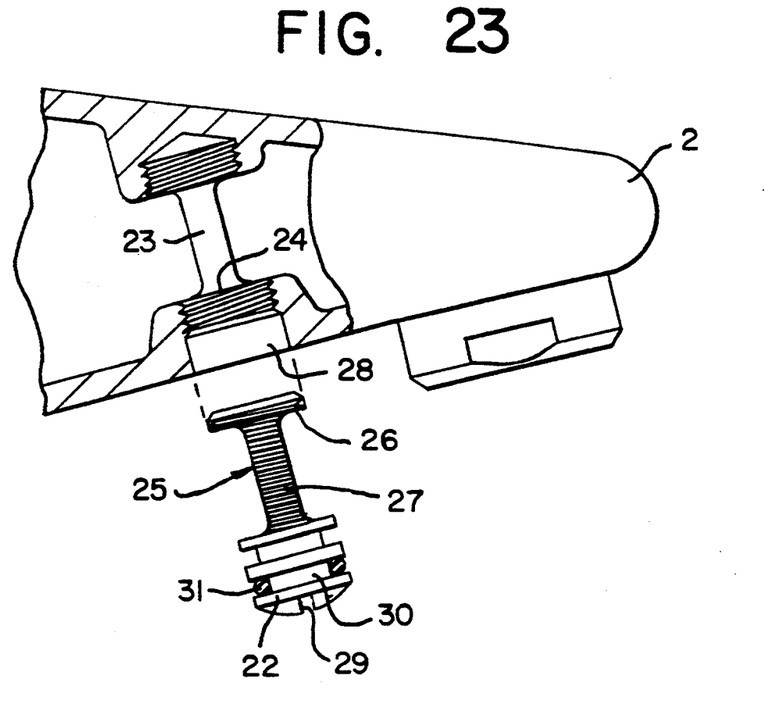
FIGS. 23 and 24—They are both views similar to the two previous ones wherein the adjustment device is placed in a position of maximum closing of the outlet duct, though it is not totally closed and a minimum outflow of water is permitted.
Figure 24:
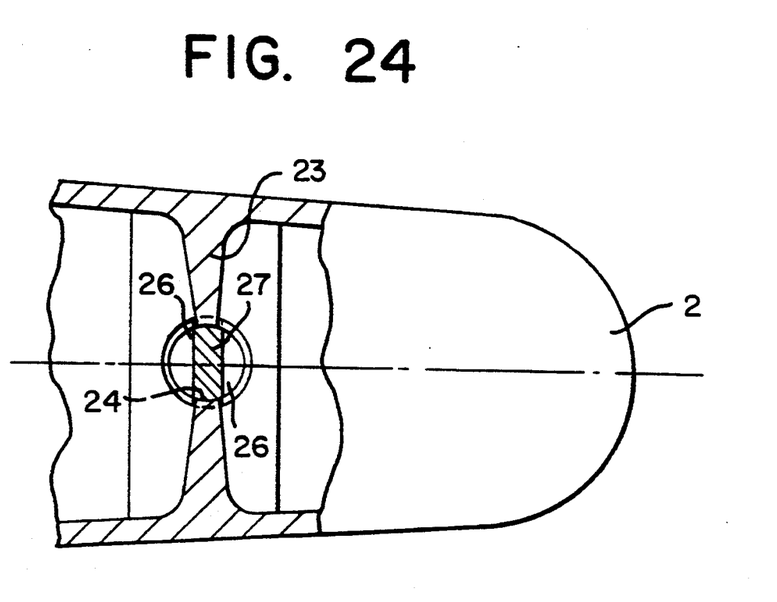

Therefore, by means of rotating the rod (25) by means of its head (22), as has been said above, it is possible to place the plate (27) in a position coplanar to the partition (23), thus determining the minimum flow position, as corresponds to FIGS. 23 and 24, while when the plate (27) remains transversal to the partition (23), as represented in FIGS. 21 and 22, then the faucet provides the maximum flow of water, with the particularity that between these limit positions the rod can be placed in any of the multiple middle positions and thus the flow can be adjusted in accordance with the user's own needs or desires, all for the purpose of rationalising the water consumption to the real needs of each case.

It is claimed:

1. A monoblock faucet comprising:
   a faucet body having an extension pipe protruding therefrom, said extension pipe having a first axis, said faucet body having a plurality of through holes to permit a flow of cold and hot water into said extension pipe, each of said plurality of through holes having a second axis;
   a handle mounted on said faucet body, said handle having a third axis, said handle being rotatably connected to said faucet body between a first limit position corresponding to a maximum cold water position and a second limit position corresponding to a maximum hot water position, said handle being pivotally connected to said faucet body between a first position corresponding to a closed flow position and between a second position corresponding to an open flow position:
   a cartridge being disposed within said faucet body, said cartridge being connected to said handle such that when said handle is rotated between said first limit position and said second limit position said cartridge regulates the proportion of hot and cold water that is permitted to flow into said extension pipe;
   each of said first axis and said third axis having a horizontal component, said cartridge being rotatable to a position when said handle is in said first limit position such that said horizontal component of said third axis is parallel to said horizontal component of said first axis.

2. The monoblock faucet according to claim 1 characterized in that the faucet body through holes are symmetric to an axis of a through hole in a base of said cartridge that is displaced with respect to the first axis, the angular amplitude of displacement between said axes of said cartridge and said first axis being approximately equal to half the angular displacement of said handle between said first limit position and said second limit position, said axes being substantially parallel in the first limit position.

3. The monoblock faucet according to claim 2, characterized in that the through holes of the base corresponding to the cartridge, are inclined and correspond with the through holes of the faucet body.

4. The monoblock faucet according to claim 1, characterized in that between the faucet body and the cartridge there is an intermediate piece having inclined holes.

5. The monoblock faucet according to claim 3, characterized in that when the cartridge is of the type whose water outflow is free from the base itself thereof, a supplementary part is provided having respective inclined holes, said supplementary part having holes and stubs for coupling between said part and the cartridge and between said part and the body itself of the faucet.

6. The monoblock faucet according to claim 5, characterized in that the axis of the supplementary part holes are inclined.

7. The monoblock faucet, according to claim 6, further comprising a flow adjustment device being disposed in said pipe, said device being comprised of a pivoting rod placed in an opening made in a transversal inner partition of the pipe the pivoting rod having two side recesses that define a diametral plate which comprises the element that limits the flow of water in order to adjust the outlet flow.

8. The monoblock faucet according to claim 7, characterized in that the intermediate opening of the transversal partition is defined by a side hole of the pipe, this side hole being threaded inside in order to receive a thread provided on the rod itself, the head of the rod slightly emerging beyond the bottom surface of the pipe.

9. The monoblock faucet according to claim 8, wherein the head of the rod has a diametral groove for movement by means of a suitable tool, so as to be able to vary the adjustment of its position and the subsequent control of the water outlet flow; said diametral groove is coplanar to the diametral plate.

10. The monoblock faucet, according to claim 9, wherein the head of the rod has an annular throat in which a seal is disposed.

11. The monoblock faucet according to claim 1, wherein a horizontal component of a symmetrical axis of a hole in said cartridge, is angularly displaced with respect to said horizontal component of said first axis, said angular displacement being approximately equal to half the angular displacement of said handle between said first limit position and said second limit position.

12. The monoblock faucet according to claim 1, wherein said cartridge has a base and a pair of inclined through holes, said through holes having a first axial end and a second axial end, said first axial end being in fluid communication with said faucet body through holes, said first axial end being angularly displaced with respect to said second axial end, said angular displacement being approximately equal to half the angular displacement of said handle between said first limit position and said second limit position.

13. The monoblock according to claim 1, further comprising a supplemental piece being disposed between said cartridge and said plurality of through holes in said faucet body, said supplemental piece having a pair of inclined through holes each having a first axial end and a second axial end, said first axial end being in fluid communication with said through holes in said faucet body, said second axial end being in fluid communication with said cartridge, said first axial end being angularly displaced with respect to said second axial end, said angular displacement being approximately equal to half the angular displacement of said handle between said first limit position and said second limit position.

14. The monoblock faucet according to claim 1, wherein it first through hole said faucet body, corresponding to cold water flow, having an inlet and an outlet, a second through hole of said faucet body, corresponding to hot water flow, having an inlet and an outlet, said first through hole outlet and said second through hole outlet each defining a symmetric axis from a center line of said faucet body, said symmetric axis having a horizontal component that is angularly displaced by a predetermined angle with respect to said horizontal component of said first axis, an amplitude of said predetermined angle being approximately equal to half of an amplitude of an angular displacement of said handle between said first limit position and said second limit position.

15. The monoblock faucet according to claim 11, wherein a first through hole of said faucet body, corresponding to cold water flow, having an inlet and an outlet, a second through hole of said faucet body, corresponding to hot water flow, having an inlet and an outlet, said first through hole outlet and said second through hole outlet each defining a symmetric axis from a center line of said faucet body, said symmetric axis having a horizontal component that is angularly displaced by a predetermined angle with respect to said horizontal component of said first axis, an amplitude of said predetermined angle being approximately equal to half of an amplitude of an angular displacement of said handle between said first limit position and said second limit position.

16. The monoblock faucet according to claim 12, wherein a first through hole of said faucet body, corresponding to cold water flow, having an inlet and an outlet, a second through hole of said faucet body, corresponding to hot water flow, having an inlet and an outlet, said first through hole outlet and said second through hole outlet each defining a symmetric axis from a center line of said faucet body, said symmetric axis having a horizontal component that is angularly displaced by a predetermined angle with respect to said horizontal component of said first axis, an amplitude of said predetermined angle being approximately equal to half of an amplitude of an angular displacement of said handle between said first limit position and said second limit position.

17. The monoblock faucet according to claim 13, wherein a first through hole of said faucet body, corresponding to cold water flow, having an inlet and an outlet, a second through hole of said faucet body, corresponding to hot water flow, having an inlet and an outlet, said first through hole outlet and said second through hole outlet each defining a symmetric axis from a center line of said faucet body, said symmetric axis having a horizontal component that is angularly displaced by a predetermined angle with respect to said horizontal component of said first axis, an amplitude of said predetermined angle being approximately equal to half of an amplitude of an angular displacement of said handle between said first limit position and said second limit position.

18. A monoblock faucet comprising:
a faucet body having an extension pipe protruding therefrom, said extension pipe having a first axis, said faucet body having a plurality of through holes to permit a flow of cold and hot water into said extension pipe, each of said plurality of through holes having a second axis;

a handle mounted on said faucet body, said handle having a third axis, said handle being rotatably connected to said faucet body between a first limit position corresponding to a maximum cold water position and a second limit position corresponding to a maximum hot water position, said handle being pivotally connected to said faucet body between a first position corresponding to a closed flow position and between a second position corresponding to an open flow position;

a cartridge being disposed within said faucet body, said cartridge being connected to said handle such that when said handle is rotated between said first limit position and said second limit position said cartridge regulates the proportion of hot and cold water that is permitted to flow into said extension pipe;

said pipe having a top surface, said handle having a bottom surface which selectively aligns with said pipe top surface such that when aligned, the space between said top surface and said bottom surface is minimized to prevent the manual pivoting of said handle with respect to said faucet body, said handle having a top surface which includes a plurality of projections to permit said handle to be rotated with respect to said faucet body.

* * * * *